(12) United States Patent
Ichihashi et al.

(10) Patent No.: US 11,941,598 B2
(45) Date of Patent: Mar. 26, 2024

(54) COMMUNICATION SYSTEM, COMMUNICATION METHOD, AND SENSOR UNIT

(71) Applicants: Norio Ichihashi, Fujisawa (JP); Kenichi Kainuma, Tokyo (JP); Hiroki Osanai, Yokohama (JP)

(72) Inventors: Norio Ichihashi, Fujisawa (JP); Kenichi Kainuma, Tokyo (JP); Hiroki Osanai, Yokohama (JP)

(*) Notice: Subject to any disclaimer, the term of this patent is extended or adjusted under 35 U.S.C. 154(b) by 244 days.

(21) Appl. No.: 17/626,052

(22) PCT Filed: Mar. 19, 2020

(86) PCT No.: PCT/JP2020/012426
§ 371 (c)(1),
(2) Date: Jan. 10, 2022

(87) PCT Pub. No.: WO2021/005841
PCT Pub. Date: Jan. 14, 2021

(65) Prior Publication Data
US 2022/0253818 A1   Aug. 11, 2022

(30) Foreign Application Priority Data

Jul. 10, 2019  (JP) .................. 2019-128812

(51) Int. Cl.
*G06Q 20/18* (2012.01)
*G06K 7/14* (2006.01)
(Continued)

(52) U.S. Cl.
CPC ........... *G06Q 20/18* (2013.01); *G06K 7/1417* (2013.01); *G06K 19/06037* (2013.01); *H04L 9/30* (2013.01); *H04L 9/3236* (2013.01)

(58) Field of Classification Search
CPC .. G06Q 20/18; G06Q 20/327; G06Q 20/3276; G06Q 20/3827; G06Q 20/425;
(Continued)

(56) References Cited

U.S. PATENT DOCUMENTS 9,153,089 B1 * 10/2015 Hewett .................. G07F 9/001
9,524,368 B2 * 12/2016 Kuehnrich .............. G07F 11/04
(Continued)

FOREIGN PATENT DOCUMENTS

JP    H07148358    6/1995
JP    2002117442   4/2002
(Continued)

OTHER PUBLICATIONS

Solano, Antonio, et al. "Smart vending machines in the era of internet of things." Future Generation Computer Systems 76 (2017): 215-220. (Year: 2017).*
(Continued)

*Primary Examiner* — Nathan A Mitchell
(74) *Attorney, Agent, or Firm* — Burris Law, PLLC

(57) ABSTRACT

The present disclosure is a sensor unit that is installed in an automatic vending machine, and unlocks the automatic vending machine, based on encrypted data transmitted from a terminal apparatus. The sensor unit includes: an encryption processor that generates a public key and a private key, and encrypts an unlocking code with the public key; a hash generator that hashes, through a hash function, sensor information including at least a sensor ID and position information on a sensor, and outputs a hash value; a manager that stores, in a storage, at least the public key and the hash value in association with each other, and manages the public key and the hash value; and an unlocker that determines success or failure of encrypted data transmitted from the terminal apparatus, and unlocks the automatic vending machine when
(Continued)

the encrypted data matches with encrypted data generated by the encryption processor.

9 Claims, 11 Drawing Sheets

(51) Int. Cl.
    *G06K 19/06*     (2006.01)
    *H04L 9/30*     (2006.01)
    *H04L 9/32*     (2006.01)

(58) Field of Classification Search
    CPC .... G06Q 2220/00; G06Q 30/06; G06Q 50/10;
          G06K 7/1417; G06K 19/06037; G06K
          19/06009; H04L 9/30; H04L 9/3236;
          H04L 9/0825; H04L 9/3213; H04L
          9/3215; H04L 9/3226; H04L 9/0643;
          H04L 9/0861; H04W 12/03; H04W
          12/068; H04W 12/084; H04W 12/63;
          H04W 12/77; H04W 4/02; H04W 4/80;
          G07F 7/02; G07F 7/10; G07F 9/001;
          G07F 9/002; G07F 11/44; G06F
          2221/2111; G06F 21/606; G06F 21/44
    See application file for complete search history.

(56) References Cited

U.S. PATENT DOCUMENTS

| | | | |
|---|---|---|---|
| 9,852,423 B2 * | 12/2017 | Sagady | G06Q 20/3829 |
| 9,898,884 B1 * | 2/2018 | Arora | G06Q 30/0226 |
| 2002/0128932 A1 * | 9/2002 | Yung | G07F 9/026 |
| | | | 705/28 |
| 2007/0096867 A1 * | 5/2007 | Denison | G06F 21/76 |
| | | | 340/5.23 |
| 2008/0162676 A1 * | 7/2008 | Magnusson | G07C 9/00309 |
| | | | 709/222 |
| 2010/0070075 A1 | 3/2010 | Chirnomas | |
| 2011/0281630 A1 * | 11/2011 | Omar | H04L 63/105 |
| | | | 463/25 |
| 2012/0187187 A1 | 7/2012 | Duff | |
| 2014/0032413 A1 * | 1/2014 | Low | G07F 9/026 |
| | | | 705/44 |
| 2015/0287030 A1 * | 10/2015 | Sagady | G06Q 20/326 |
| | | | 705/71 |
| 2016/0335620 A1 * | 11/2016 | Lyons | G06Q 20/40 |
| 2017/0266544 A1 | 9/2017 | Huang | |
| 2019/0325411 A1 | 10/2019 | Kai | |
| 2020/0273042 A1 * | 8/2020 | Wang | G07F 11/60 |
| 2020/0349550 A1 * | 11/2020 | Hindocha | G06Q 20/3223 |
| 2021/0192479 A1 * | 6/2021 | Swaminathan | G06Q 20/3226 |
| 2022/0012976 A1 * | 1/2022 | Saupe | G07F 9/105 |
| 2023/0138605 A1 * | 5/2023 | Donaghey | G07F 9/001 |
| | | | 705/21 |

FOREIGN PATENT DOCUMENTS

| | | |
|---|---|---|
| JP | 2002140756 | 5/2002 |
| JP | 2002150370 | 5/2002 |
| JP | 2002298203 | 10/2002 |
| JP | 2002358558 | 12/2002 |
| JP | 2004348238 | 12/2004 |
| JP | 2013235442 | 11/2013 |
| KR | 1020020011883 | 2/2002 |
| WO | 2016123545 | 8/2016 |
| WO | 2018042669 | 3/2018 |
| WO | 2018111858 | 6/2018 |
| WO | 2018112089 | 6/2018 |

OTHER PUBLICATIONS

Office Action issued in corresponding IN Application 202217003097, dated Jun. 17, 2022, 7 pages.
International Search Report for International Application PCT/JP2020/012426, dated Jun. 23, 2020.
Extended European Search Report issued in corresponding EP Application 20837085.8, dated Jun. 15, 2023, 5 pages.

* cited by examiner

COMMUNICATION SYSTEM, COMMUNICATION METHOD, AND SENSOR UNIT

CROSS-REFERENCE TO RELATED APPLICATIONS

This application is a National Phase of International Application No. PCT/JP2020/012426, filed on Mar. 19, 2020, which claims priority to and the benefit of Japanese Patent Application No. 2019-128812, filed on Jul. 10, 2019. The disclosures of the above applications are incorporated herein by reference.

FIELD

The present disclosure relates to a communication system, a communication method, and a sensor unit.

BACKGROUND

Some games using an electric communication line, such as the Internet, employ mechanisms called "gacha" as mechanisms for obtaining special items in games, game characters and the like. "Gacha" is a virtual automatic vending machine that simulates an automatic vending machine that discharges a capsule containing a toy when a coin is inserted and a handle is turned (what is called "gacha-gacha" or "gachapon": see Patent Literature 1).

SUMMARY

A game using gacha allows an item or the like to be obtained by inserting, in to the gacha, a virtual coin distributed for a fee or free. In such a type of game, purchasing a fee-based coin is called charging. In some cases, gacha that requires a fee-based coin can obtain a strong item or a rare character that is normally unavailable (or difficult to obtain) by charging of several hundred yen per time. Accordingly, there are users who pay a considerable amount until a desired item or the like is obtained, and have great difficulty in paying the amount. This is not limited to item vending through virtual automatic vending machines, and is a problem common to item vending through automatic vending machines including "gacha-gacha". Unlike face-to-face sales where sellers of items attending directly to purchasers, item vending through automatic vending machines does not allow the sellers to call purchasers' attention. Hereinafter, in this Description, both tangible automatic vending machines, such as "gacha-gacha", and virtual automatic vending machines are collectively called "automatic vending machines".

The present disclosure has been made in view of the situations described above, and has an object to provide a technology capable of remotely managing item vending through automatic vending machines.

Solution to Problem

To solve the problem described above, a communication method according to a first aspect of the present disclosure includes: a first step of causing a terminal apparatus to image a two-dimensional code assigned to an automatic vending machine and obtain a vending machine ID, obtain position information, and transmit the vending machine ID and the position information to a first server apparatus, to thus request obtainment of encrypted data pertaining to unlocking of the automatic vending machine; a second step of causing the first server apparatus to determine whether the vending machine ID and the position information match with stored information, and transmit item information to the terminal apparatus when the information matches; a third step of causing a second server apparatus to receive a settlement request issued by the terminal apparatus, execute a settlement process, and transmit a settlement token to the first server apparatus; a fourth step of causing the first server apparatus to receive the settlement token, generate a hash value obtained by hashing sensor information through a hash function, and transmit the hash value to the terminal apparatus; a fifth step of causing the terminal apparatus to issue a search request to a virtual server apparatus group that achieves a hash pool by the hash value; a sixth step of causing the virtual server apparatus group to receive the search request, identify presence of the hash value, and transmit a public key to a third server apparatus in a case of the presence; a seventh step of causing the third server apparatus to generate an unlocking code, encrypt the unlocking code with the public key, and transmit encrypted data to the terminal apparatus; an eighth step of causing the terminal apparatus to transmit the encrypted data to a sensor unit of the automatic vending machine to thus request unlocking of the automatic vending machine; and a ninth step of causing the sensor unit to determine success or failure of the encrypted data, and unlock the automatic vending machine in a case of the success.

A communication system according to a second aspect of the present disclosure includes: a terminal apparatus that images a two-dimensional code assigned to an automatic vending machine and obtains a vending machine ID, obtains position information during imaging, transmits the vending machine ID and the position information to a first server apparatus, and issues a search request to a virtual server apparatus group that achieves a hash pool by a hash value transmitted from the first server apparatus, and then transmits encrypted data transmitted from a third server apparatus, to a sensor unit of the automatic vending machine, to thus request unlocking of the automatic vending machine; the first server apparatus determines whether the vending machine ID and the position information match with stored information, transmits item information to the terminal apparatus when the information matches, and upon receipt of a settlement token, generates the hash value obtained by hashing stored sensor information through a hash function, and transmits the hash value to the terminal apparatus; a virtual server apparatus group that, when receiving a search request by the hash value from the terminal apparatus, identifies presence of the hash value, and transmits a public key to the third server apparatus in a case of the presence; the third server apparatus that generates an unlocking code, encrypts the unlocking code with the public key, and transmits the encrypted data to the terminal apparatus; and a sensor unit that generates the public key and transmits the public key to the virtual server apparatus group, and receives the encrypted data from the terminal apparatus, and determines success or failure of the encrypted data, and unlocks the automatic vending machine in a case of determination of the success.

A sensor unit according to a third aspect of the present disclosure is a sensor unit that is installed in an automatic vending machine, and unlocks the automatic vending machine, based on encrypted data transmitted from a terminal apparatus, the sensor unit including: an encryption processor that generates a public key and a private key, and encrypts an unlocking code with the public key; a hash generator that hashes, through a hash function, sensor information including at least a sensor ID and position information on a sensor, and outputs a hash value; a manager that stores, in a storage, at least the public key generated by the encryption processor, and the hash value generated by the hash generator, in association with each other, and manages the public key and the hash value; and an unlocker that determines success or failure of encrypted data transmitted from the terminal apparatus, and unlocks the automatic vending machine when the encrypted data matches with encrypted data generated by the encryption processor.

The present disclosure can provide a technology capable of remotely managing vending of an item through an automatic vending machine. In particular, the sensor unit can be implemented by retrofitting to an existing automatic vending machine, such as gacha. In this case, vending through the existing automatic vending machine or the like can be remotely managed.

DRAWINGS

DETAILED DESCRIPTION

Figure 1:
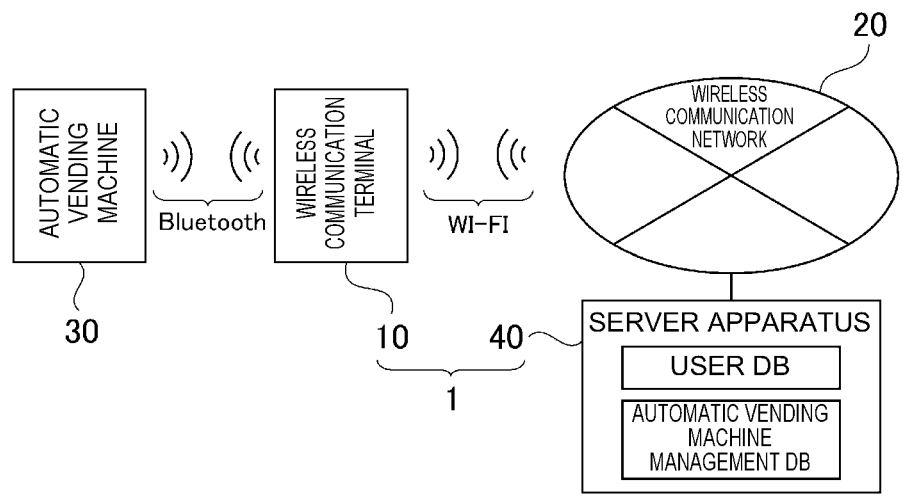
FIG. 1 is a block diagram showing a configuration example of a wireless communication system according to a first embodiment of the present disclosure.

Hereinafter, referring to the drawings, embodiments of the present disclosure are described.

First Embodiment

FIG. 1 is a block diagram showing a configuration example of a wireless communication system 1 according to a first embodiment of the present disclosure. As shown in FIG. 1, the wireless communication system 1 includes a wireless communication terminal 10, and a server apparatus 40 connected to a wireless communication network 20. Although detailed illustration is omitted in FIG. 1, the wireless communication network 20 includes a wired communication network. The server apparatus 40 is connected to the wired communication network.

The wireless communication terminal 10 is, for example, a smartphone. The wireless communication terminal 10 is housed in the wireless communication network 20, and wirelessly communicates according to a predetermined wireless communication standard (WI-FI in this embodiment but is not limited thereto). The wireless communication terminal 10 has a function of performing near field communication with another apparatus in conformity with a wireless communication standard different from the wireless communication standard described above. Hereinafter, the latter wireless communication standard is called "first wireless communication standard", and the former wireless communication standard is called "second wireless communication standard". As described above, a specific example of the second wireless communication standard is WI-FI. On the other hand, a specific example of the first wireless communication standard may be Bluetooth (registered trademark) or IrDA. In this embodiment, Bluetooth (registered trademark) is adopted as the first wireless communication standard.

Figure 2:
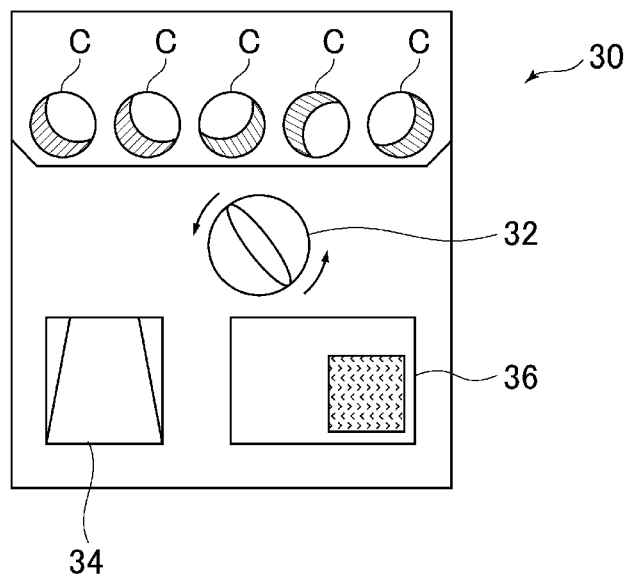
FIG. 2 is a front view of an automatic vending machine that performs near field communication with a wireless communication terminal.

The automatic vending machine 30 in FIG. 1 is "gacha-gacha" described above. The automatic vending machine 30 has a function of performing near field communication with the wireless communication terminal 10 in conformity with the first wireless communication standard. FIG. 1 shows only one automatic vending machine 30. Alternatively, the number of automatic vending machines 30 may be two or more. FIG. 2 is a front view of the automatic vending machine 30. In the automatic vending machine 30, after a payment for an item is inserted (in this embodiment, a virtual coin is inserted), a handle 32 is turned in the direction of arrows, one capsule C that contains a toy is discharged from an outlet 34. In proximity to the outlet 34, a printed copy 36 on which a matrix two-dimensional code associated with an identifier (e.g., a character string made up of a predetermined number of alphanumeric characters) uniquely indicating the automatic vending machine 30 is printed is pasted.

The automatic vending machine 30 is in a locked state of prohibiting items from being vended until receipt of a security code for lifting the prohibition of vending items, through near field communication. Even if the handle 32 is turned in a state where the security code has not been received yet, the capsule C is not discharged. The security code is one-time 256-byte data that is randomly generated by the server apparatus 40. Every time the server apparatus 40 receives an identifier uniquely indicating the automatic vending machine 30, this apparatus issues a security code associated with the identifier, and returns the code to the source of the identifier.

As shown in FIG. 1, the server apparatus 40 is a computer apparatus that includes a user DB and an automatic vending machine management DB, and not only issues the security code and the virtual coin, but also settles the issuance fee for the virtual coin (in other words, settles the payment for an item). Position information indicating the installation place of the automatic vending machine 30 (e.g., information indicating the latitude and longitude of the installation place), and information for issuing the security code are stored in association with the identifier of the automatic vending machine 30 in the automatic vending machine management DB. In a case of generating the security code according to a predetermined pseudorandom number generation algorithm, specific examples of information for issuing a security code include an initial value (what is called a seed of the pseudorandom number) in the algorithm, and a most recently issued security code.

The user DB is a database for lifting prohibition of item vending by the automatic vending machine 30 and for managing a user intending to purchase an item, using the wireless communication system 1. The user DB stores information that indicates histories of purchases of items by users and settlement histories of payments for items, in association with the identifiers uniquely indicating the respective users. Specific examples of identifiers for uniquely identifying users include user IDs assigned to the respective users when contracts for using services by the wireless communication system 1 are signed.

A distributed ledger technology that is called a blockchain is used for settlements of payments for items in this embodiment. The blockchain is a database that includes a sequentially increasing list of ordered records that are called blocks. In this embodiment, each block in the blockchain corresponds to one settlement. Each block includes information about the settlement, a timestamp indicating the time of execution of the settlement, and a link to a previous block.

As described above, in proximity to the outlet 34 of the automatic vending machine 30, the printed copy 36 on which the matrix two-dimensional code associated with the identifier uniquely indicating the automatic vending machine 30 is printed is pasted. A user of the wireless communication terminal 10 reads the matrix two-dimensional code using the wireless communication terminal 10, transmits the identifier obtained from the code to the server apparatus 40, thereby allowing the locked state of the automatic vending machine 30 to be unlocked (i.e., allowing prohibition of item vending to be lifted). Hereinafter, the wireless communication terminal 10 that plays a primary role when lifting the prohibition of item vending by the automatic vending machine 30 is described.

Figure 3:
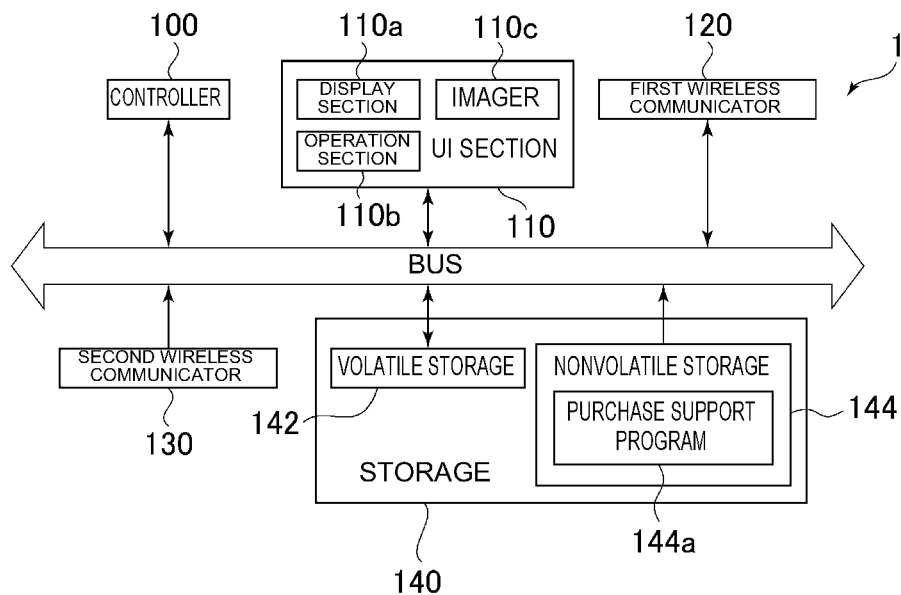
FIG. 3 is a block diagram showing a configuration example of the wireless communication terminal.

FIG. 3 is a block diagram showing a configuration example of the wireless communication terminal 10. As shown in FIG. 3, the wireless communication terminal 10 includes a controller 100, a user interface section 110, a first wireless communicator 120, a second wireless communicator 130, a storage 140, and a bus 150 that intermediates about data exchange between these configuration elements. Note that in FIG. 3, the user interface section is abbreviated as "UI section". Hereinafter, also in this Description, similar abbreviation applies.

The controller 100 is, for example, a computer, such as a CPU (Central Processing Unit). The controller 100 executes a program stored in the storage 140 (more correctly, a nonvolatile storage 144), and functions as a control center of the wireless communication terminal 10.

The UI section 110 is an aggregation of devices that provide user interfaces for allowing the user to use the wireless communication terminal 10. As shown in FIG. 1, the UI section 110 includes a display section 110a, an operation section 110b, and an imager 110c. The UI section 110 includes not only these components, but also an audio input and output section that collects audio of a user and outputs audio represented by audio data. However, the audio input and output section has little relationship with the present disclosure. Accordingly, illustration and detailed description of the audio input and output section are omitted.

The display section 110a is, for example, a liquid crystal display, and a drive circuit for this display. The display section 110a displays images of various screens for prompting the user to use the wireless communication terminal 10, under control by the controller 100. The imager 110c is, for example, an image sensor. The imager 110c takes an image in an imaging view field, and outputs image data representing the imaging result, to the controller 100. The operation section 110b is a transparent sheet-shaped touch sensor provided so as to cover a display area of the display section 110a. The operation section 110b, together with the display section 110a, forms what is called a touch panel. The user of the wireless communication terminal 10 can achieve various inputs through a touch operation or a flick operation onto the operation section 110b. When the user performs a touch operation, a flick operation or the like onto the operation section 110b, this operation section 110b outputs data representing operation content of the user, to the controller 100. The operation performed by the user is thus transmitted to the controller 100.

The first wireless communicator 120 is a communication circuit that performs wireless communication conforming to the first wireless communication standard. The first wireless communicator 120 receives data transmitted from an opposite apparatus of wireless communication conforming to the first wireless communication standard and transfers the data to the controller 100, and transmits the data transferred from the controller 100, to the opposite apparatus. The second wireless communicator 130 performs wireless communication conforming to the second wireless communication standard, with a base station of the wireless communication network 20. The second wireless communicator 130 transmits the data provided by the controller 100, to the wireless communication network 20, and receives the data sent from the wireless communication network 20 and transfers the received data to the controller 100.

The storage 140 includes a volatile storage 142, and a nonvolatile storage 144. The volatile storage 142 is, for example, a RAM (Random Access Memory). The volatile storage 142 is used, by the controller 100, as a work area when the program is executed. The nonvolatile storage 144 is, for example, a flash ROM (Read Only Memory). The nonvolatile storage 144 stores various types of programs and various types of data. Specific examples of the programs stored in the nonvolatile storage 144 include a kernel program for causing the controller 100 to achieve an OS (Operating System), various types of application programs such as a web browser and an email client, and a purchase support program 144a for causing the controller 100 to perform an unlocking process that significantly indicates the characteristics of the present disclosure.

Among the programs stored in the nonvolatile storage 144, programs other than the purchase support program 144a are not specifically different from those installed in a typical smartphones. For example, when the power source of the wireless communication terminal 10 (not shown in FIG. 3) is turned on, the controller 100 reads the kernel program from the nonvolatile storage 144 into the volatile storage 142, and starts execution of this program. The controller 100, which is activated according to the kernel program and is in a state of achieving the OS, can execute the purchase support program 144a and other application programs, and perform operation control for the configuration elements, such as the UI section 110, other than the controller 100, according to an instruction input through an operation onto the operation section 110b. As described above, the programs other than the purchase support program 144a are not specifically different from those installed in a typical smartphones. Accordingly, the detailed description is omitted. Hereinafter, the purchase support program 144a is mainly described.

Figure 4:
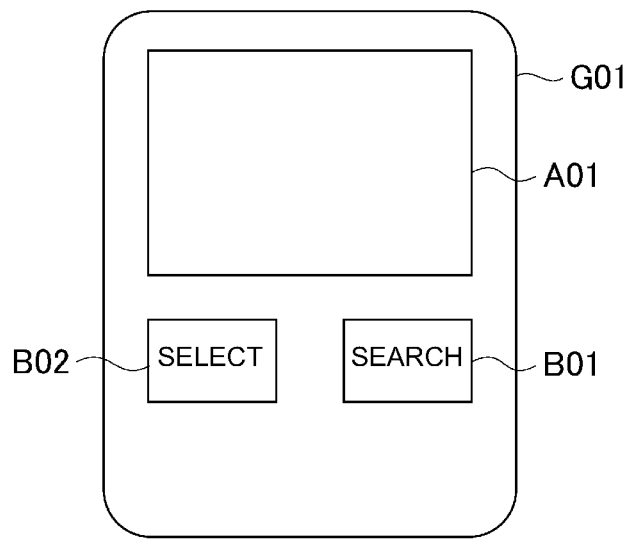
FIG. 4 shows an example of a screen displayed on a display section of the wireless communication terminal.

The controller 100 instructed to execute the purchase support program 144a through the operation onto the operation section 110b reads the purchase support program 144a from the nonvolatile storage 144 into the volatile storage 142, and starts the execution of the program. The controller 100 in operation according to the purchase support program 144a causes the display section 110a to display a screen G01 shown in FIG. 4.

A virtual operation piece B01 on the screen G01 is a virtual operation piece for searching for the installation place of the automatic vending machine 30. When a touch operation for the virtual operation piece B01 is performed, the controller 100 transmits, to the server apparatus 40, position information indicating the current position of the wireless communication terminal 10. Note that the current position of the wireless communication terminal 10 may be identified using an existing technology, such as GPS.

The server apparatus 40 refers to the automatic vending machine management DB, and identifies the automatic vending machine 30 installed in a predetermined range (e.g., a range with a radius of 100 meters) centered on the position indicated by the position information received from the wireless communication terminal 10. The server apparatus 40 then returns the position information indicating the installation place of the identified automatic vending machine 30, to the wireless communication terminal 10.

Figure 5:
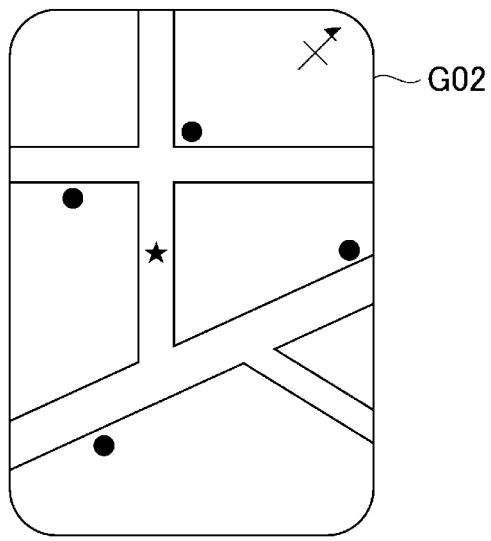
FIG. 5 shows an example of a search result screen displayed on the display section of the wireless communication terminal.

Upon receipt of the position information returned from the server apparatus 40, the controller 100 causes the display section 110a to display a search result screen G02 shown in FIG. 5. An image of the search result screen G02 is an image obtained by plotting an icon (a star-shaped icon in FIG. 5) indicating the current position, and icons (black filled circles in FIG. 5) corresponding to the respective automatic vending machines 30, on an image of a map in the predetermined range. The user viewing the search result screen G02 can refer to information displayed on the search result screen G02, and go to the installation place of a nearby automatic vending machine 30.

Figure 6:
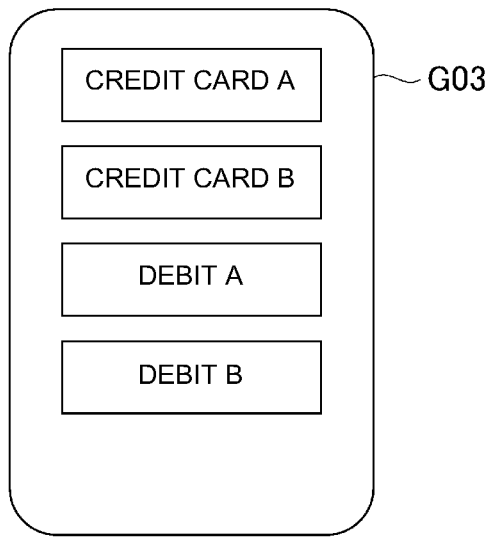
FIG. 6 shows an example of a settlement means selection screen displayed on the display section of the wireless communication terminal.

When a touch operation onto the virtual operation piece B02 on the screen G01 is performed, the controller 100 causes the displayed image on the display section 110a to transition to a settlement means selection screen G03 shown in FIG. 6. The settlement means selection screen G03 is a screen for allowing the user to select settlement means (a credit card etc.) used to settle a virtual coin for purchasing an item. When the settlement means is selected by an operation onto the operation section 110b, the controller 100 writes information indicating the selected settlement means into the volatile storage 142, and causes the displayed image on the display section 110a to transition to the screen G01.

In an area A01 on the screen G01, an image taken by the imager 110c is displayed. The user of the wireless communication terminal 10 holds the wireless communication terminal 10 in proximity to the outlet 34 of the automatic vending machine 30 and adjusts the attitude of the terminal so as to display, in the area A01, the entire matrix two-dimensional code associated with the identifier of the automatic vending machine 30, and takes an image of the matrix two-dimensional code. The controller 100 obtains the identifier of the automatic vending machine 30 by analyzing the taken image.

When the identifier of the automatic vending machine 30 is obtained, the controller 100 starts the unlocking process.

Figure 7:
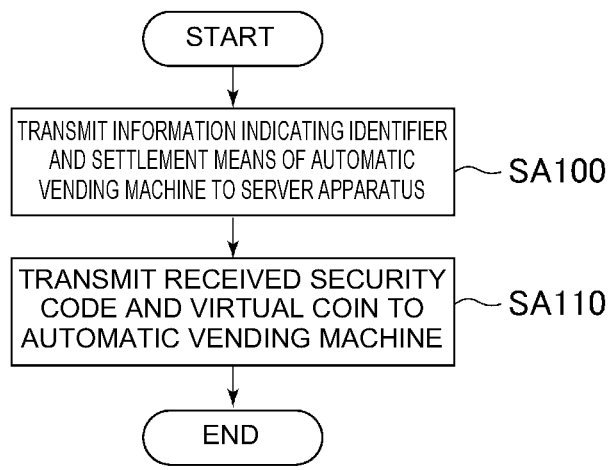
FIG. 7 is a flowchart showing a flow of an unlocking process that a controller of the wireless communication terminal executes according to a purchase support program.

FIG. 7 is a flowchart indicating the flow of the unlocking process. As shown in FIG. 7, first, the controller 100 transmits the identifier obtained by the procedures described above, and information indicating the settlement means selected on the settlement means selection screen G03, through the second wireless communicator 130, to the server apparatus 40 (step SA100).

Upon receipt of the identifier and the information indicating the settlement means transmitted from the wireless communication terminal 10, the server apparatus 40 refers to the stored content in the automatic vending machine management DB and issues a security code associated with the identifier, and issues a virtual coin for purchasing an item and settles the payment for the item through the settlement means indicated by the received information. The server apparatus 40 then returns the issued security code and virtual coin to the source of the identifier.

Upon receipt of the security code and the virtual coin returned from the server apparatus 40, the controller 100 transmits the received security code and virtual coin through the first wireless communicator 120 to the automatic vending machine 30 (step SA110).

Upon receipt of the security code and virtual coin transmitted from the wireless communication terminal 10, the automatic vending machine 30 lifts the prohibition of item purchasing. Accordingly, the item to be vended by the automatic vending machine 30 can be purchased (execution of the gacha-gacha in this embodiment). When the item purchasing by the user of the wireless communication terminal 10 is completed, the automatic vending machine 30 is returned to the lock state.

As described above, according to the first embodiment, by issuing the security code, vending of items by the automatic vending machine can be remotely managed. For example, after the total amount of item purchasing payments in a predetermined period (e.g., one month) reaches a predetermined upper limit value, a new security code is prevented from being issued until this period elapses, which can in turn prevent excessive charging on gacha-gacha.

The first embodiment of the present disclosure has thus been described above. It is a matter of course that the following modifications may be applied to this embodiment.

(1) Although the automatic vending machine 30 in the embodiment described above is "gacha-gacha", it is a matter of course that the machine may be an automatic vending machine of soft drinks, alcohol drinks, foods, books, tobacco, etc., or a virtual automatic vending machine, such as of "gacha" in a computer game. That is, items vended through the automatic vending machine 30 are not limited to tangible objects, such as toys, and may be data, such as on items in games or game characters. In the embodiment described above, the virtual coin intervenes in settlement of the item vending payment. Alternatively, similar to the conventional gacha-gacha, settlement may be achieved only with actual money without intervention of the virtual coin. In this case, the server apparatus 40 may only need to return the security code.

(2) Although the printed copy 36 on which the matrix two-dimensional code associated with the identifier uniquely indicating the automatic vending machine 30 is printed is pasted onto the automatic vending machine 30 in the embodiment described above, a printed copy on which a character string representing the identifier may be pasted instead. This is because the printed copy on which a character string representing the identifier is imaged by the imager 110c, and character recognition is applied to the taken image to thereby allow the identifier to be obtained.

The user viewing the character string printed on the printed copy may input the characters constituting this character string one by one through operations on the operation section 110*b* (operations on a virtual keyboard). In this case, the imager 110*c* may be omitted.

(3) In the embodiment described above, the wireless communication system 1 including the wireless communication terminal 10 has thus been described. Alternatively, only the wireless communication terminal 10 can be manufactured or sold as a single unit. The wireless communication terminal 10 in the embodiment described above is a smartphone. Alternatively, the terminal may be a tablet terminal, a note type personal computer, or a wearable computer or the like.

It is only required to provide a wireless communication terminal that includes: a controller; a first wireless communicator that performs near field communication conforming to a first wireless communication standard; and a second wireless communicator that performs communication conforming to a second wireless communication standard different from the first wireless communication standard, wherein in order to uniquely identify an automatic vending machine that performs near field communication with another apparatus in conformity with the first wireless communication standard, and is prohibited from vending items until receipt of a security code for lifting the prohibition of vending items, when an identifier assigned to the automatic vending machine is input, the controller transmits the input identifier by the second wireless communicator to a server apparatus which, upon receipt of the identifier through communication conforming to the second wireless communication standard, issues the security code and transmits the code to the source of the identifier, and the second wireless communicator receives the security code returned from the server apparatus, and the first wireless communicator transmits the received security code to the automatic vending machine.

(4) In the embodiment described above, the purchase support program 144*a* for causing the controller 100 to execute the unlocking process significantly indicating the characteristics of the present disclosure is preliminarily installed in the nonvolatile storage 144 of the wireless communication terminal 10. Alternatively, the purchase support program 144*a* may be manufactured or sold as a single unit. It is only required to provide a program that causes a computer to execute: a first step of transmitting an input identifier in conformity with a second wireless communication standard, upon input of the identifier assigned to an automatic vending machine, to a server apparatus that issues the security code and returns the code to the source of the identifier upon receipt of the identifier through communication conforming to the second wireless communication standard different from a first wireless communication standard, in order to uniquely identify the automatic vending machine that performs near field communication with another apparatus in conformity with the first wireless communication standard, and is prohibited from vending items until receipt of a security code for lifting the prohibition of vending items; and a second step of receiving the security code returned from the server apparatus, and transmitting the received security code to the automatic vending machine in conformity with the first wireless communication standard.

This is because the wireless communication terminal is allowed to function as the wireless communication terminal 10 in the embodiment described above, by installing the program in a conventional wireless communication terminal, and causing a controller (computer) of the wireless communication terminal to operate according to the program. Note that specific providing modes of the program described above include a mode of writing the program in a computer-readable recording medium, such as a flash ROM, and distributing the medium, and a mode of distributing the program through downloading via an electric communication line, such as the Internet.

Second Embodiment

A communication system, a communication method and a sensor unit according to the second embodiment of the present disclosure can unlock a lock pertaining to vending of an automatic vending machine, such as gacha, through a terminal apparatus of a user having completed settlement, and allow items to be purchased. In particular, the sensor unit can be implemented by retrofitting to an existing automatic vending machine. In this case, for the automatic vending machine, unlocking and item purchasing can be allowed through the terminal apparatus of the user. Note that for a digital virtual automatic vending machine, a function equivalent to that of the sensor unit can be implemented by retrofitting, as a plug-in. Hereinafter, detailed description is provided.

Figure 8:
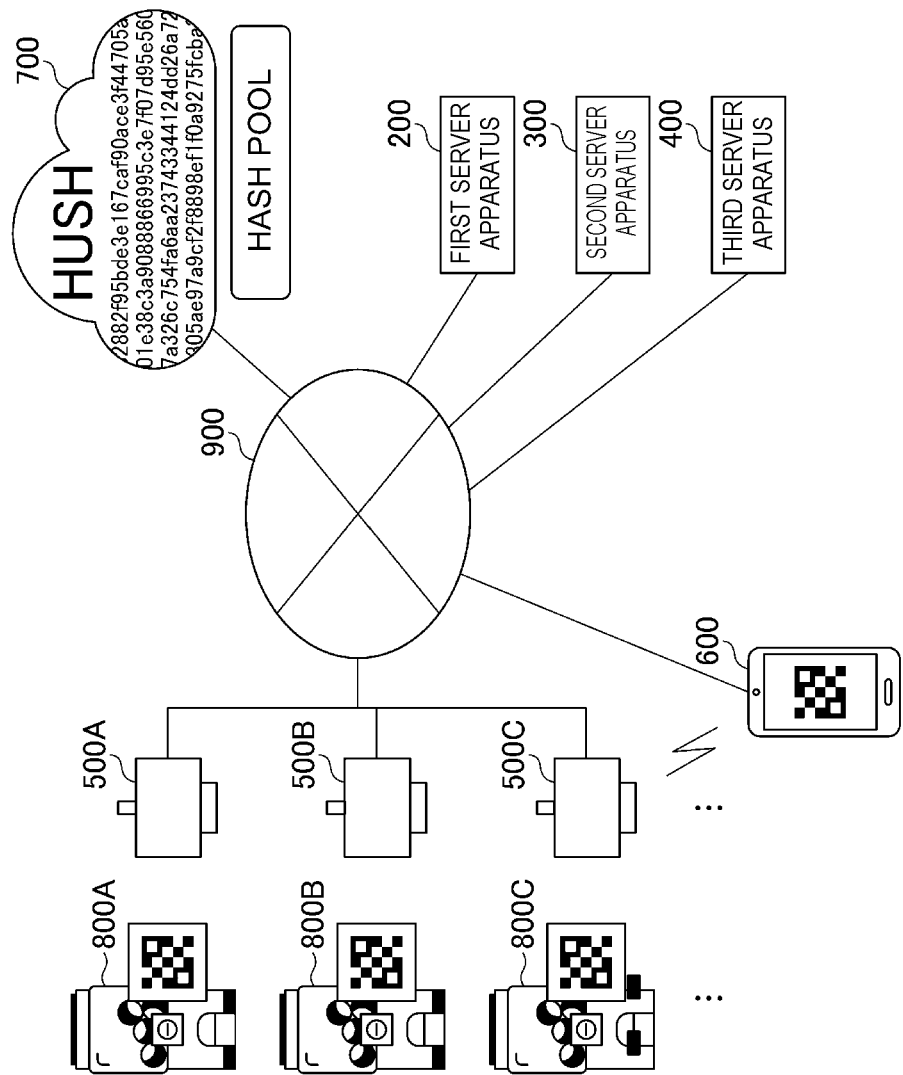
FIG. 8 is a configuration diagram of a communication system according to a second embodiment of the present disclosure.

FIG. 8 shows the configuration of a communication system according to the second embodiment, and description is made.

As shown in this diagram, the communication system according to this embodiment includes: a first server apparatus 200 that may be a database server apparatus or the like; a second server apparatus 300 equipped with settlement means; a third server apparatus 400; automatic vending machines 800A to 800C . . . (hereinafter a symbol 800 is used for collective reference); sensor units 500A to 500C (hereinafter a symbol 500 is used for collective reference) mounted on the respective automatic vending machines 800A to 800C . . . ; a terminal apparatus 600 of a user; and a virtual server apparatus group 700 that achieves a hash pool. A communication system may be achieved with any combination of some of these components in some cases. The terminal apparatus 600 of the user may be any of various types, such as a smartphone or a tablet terminal, and a node type personal computer.

Figure 9:
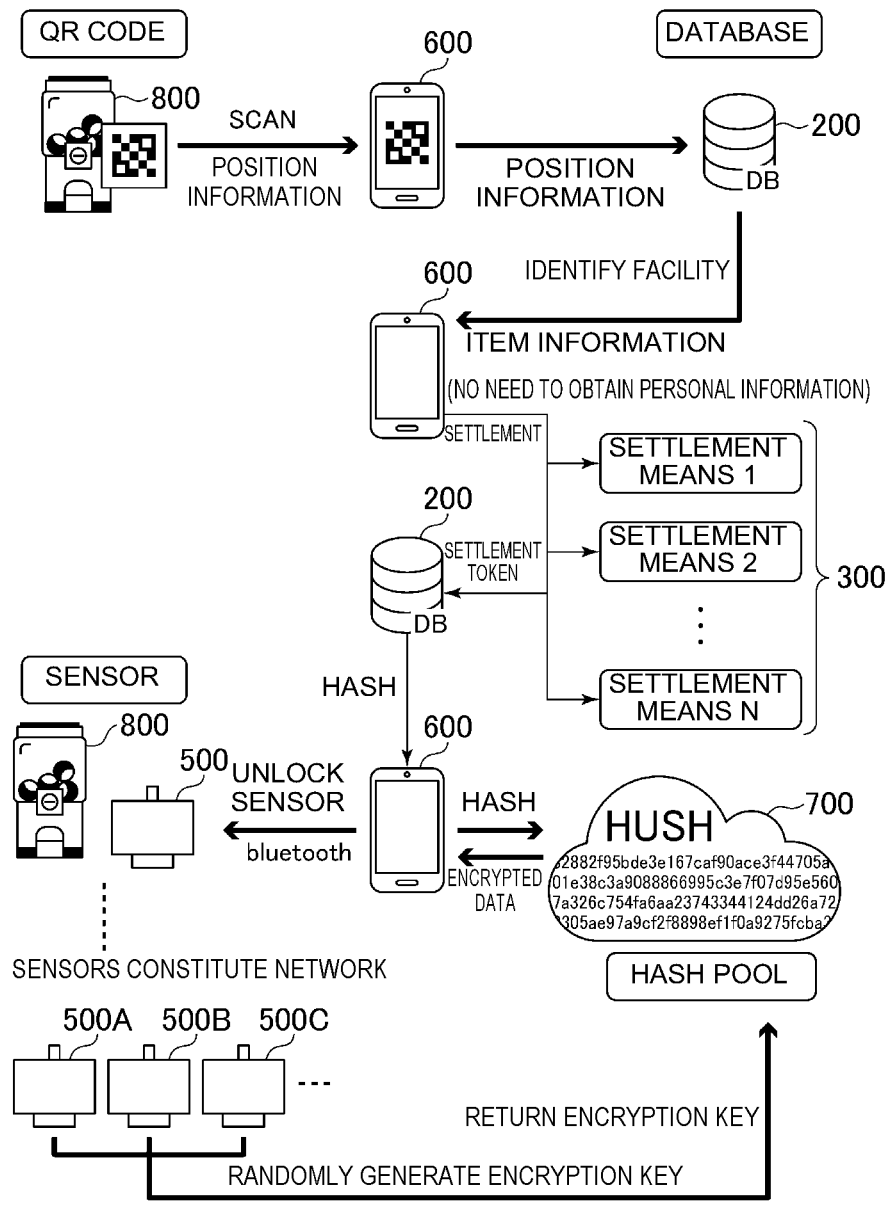
FIG. 9 is a conceptual diagram showing processing procedures by this system.

Hereinafter, referring to a conceptual diagram of FIG. 9, processing procedures of the wireless communication system are described. This also corresponds to a communication method according to this embodiment.

The terminal apparatus 600 of the user images a two-dimensional code assigned to an automatic vending machine 800 and obtains an ID of the automatic vending machine, obtains position information during imaging, and transmits these pieces of information to the first server apparatus 200, thus requesting obtainment of encrypted data pertaining to unlocking of the automatic vending machine 800. The first server apparatus 200 determines whether the ID of the automatic vending machine and the position information obtained match with recorded information. In a case of matching, the first server apparatus 200 transmits item information about a line of items in the automatic vending machine to the terminal apparatus 600. The terminal apparatus 600 of the user displays the item information in a selectable manner, and allows a desired item to be identified, thus proceeding settlement procedures.

A settlement request issued by the terminal apparatus 600 of the user is sent to the second server apparatus 300 that achieves the selected settlement means. The settlement process is executed by the second server apparatus 300, and subsequently a settlement token is sent to the first server apparatus 200. Upon receipt of the settlement token, the second server apparatus 200 generates a hash value obtained by hashing sensor information through a hash function, and transmits the hash value to the terminal apparatus 600 of the user. Upon receipt of the hash value, the terminal apparatus 600 of the user issues a search request based on the received hash value, to the virtual server apparatus group 700 that achieves the hash pool. Upon receipt of the search request, the virtual server apparatus group 700 identifies presence of the hash value, and transmits a public key to the third server apparatus 400 in a case of the presence. The third server apparatus 400 generates an unlocking code, encrypts the unlocking code with the public key, and transmits the encrypted data to the terminal apparatus 600.

Thus, the terminal apparatus 600 wirelessly communicates with the sensor unit 500 of the automatic vending machine 800 through wireless means, such as Bluetooth (registered trademark), and transmits the encrypted data to the sensor unit 500, thus requesting unlocking of the automatic vending machine. On the automatic vending machine side, the sensor unit 500 determines success or failure of the encrypted data, and unlocks the automatic vending machine 800 in a case of the success. The user thus obtains an item through the automatic vending machine 800.

Figure 10:
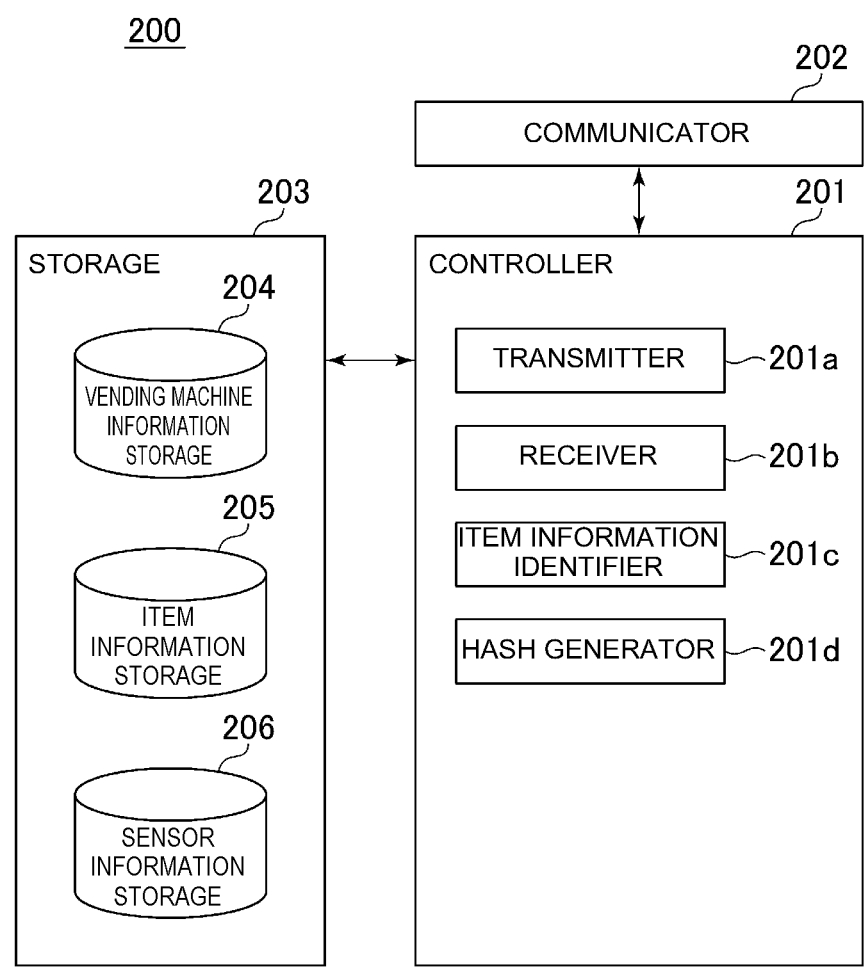
FIG. 10 is a configuration diagram of a first server apparatus.

Here, FIG. 10 shows the configuration of the first server apparatus, and description is made. The first server apparatus may be, for example, a database server apparatus or the like.

As shown in this diagram, the first server apparatus 200 includes a controller 201, a communicator 202, and a storage 203. The controller 201, the communicator 202, and the storage 203 are communicably connected to each other via a bus. Besides these components, an input section that includes a keyboard and a mouse, and a display section, such as a liquid crystal display, for displaying various types of indications may be provided.

The communicator 202 is a communication interface that is achieved by, for example, a network interface card (NIC) or the like, is connected wiredly or wirelessly to a communication network 900, such as the Internet, and communicates with the terminal apparatus 600 and the like.

The storage 203 is achieved by, for example, a semiconductor memory element, such as a RAM (Random Access Memory) or a flash memory, a hard disk drive (HDD), an optical disk device or the like, and preliminarily stores a program to be executed by the controller 201. The storage 203 includes a vending machine information storage 204, an item information storage 205, and a sensor information storage 206.

In more detail, the vending machine information storage 204 stores the vending machine ID, position information about the installation place of the vending machine, the item ID of the item to be vended and the like in association with each other. The item information storage 205 stores each item ID, and detailed information about the corresponding item (the type name, unit price, quantity, etc.) in association with each other. The sensor information storage 20 stores the sensor ID of the sensor unit 500, position information (location), and the vending machine ID of the automatic vending machine where the storage is installed, in association with each other.

The controller 201 is achieved by a CPU (Central Processing Unit), an MPU (Micro Processing Unit) and the like, and executes the program stored in the storage 203, thereby functioning as a transmitter 201a, a receiver 201b, an item information identifier 201c, and a hash generator 201d. Note that the controller 201 may include an integrated circuit, such as an ASIC (Application Specific Integrated Circuit) or an FPGA (Field Programmable Array).

The transmitter 201a transmits, for example, item information in the item information storage 205, the hash value generated by the hash generator 201d and the like, to the terminal apparatus 600 of the user via the communicator 202. The receiver 201b receives, via the communicator 202, the vending machine ID and the position information sent from the terminal apparatus 600 of the user, and the settlement token and the like transmitted from the second server apparatus 300. The item information identifier 201c then refers to the vending machine information storage 204 on the basis of the vending machine ID sent from the terminal apparatus 600 of the user, identifies the item ID of an item to be vended, refers to the item information storage 205 on the basis of the item ID, and identifies the item information. The hash generator 201d hashes the sensor information stored in the sensor information storage 206, through a hash function, and generates a hash value.

Figure 11:
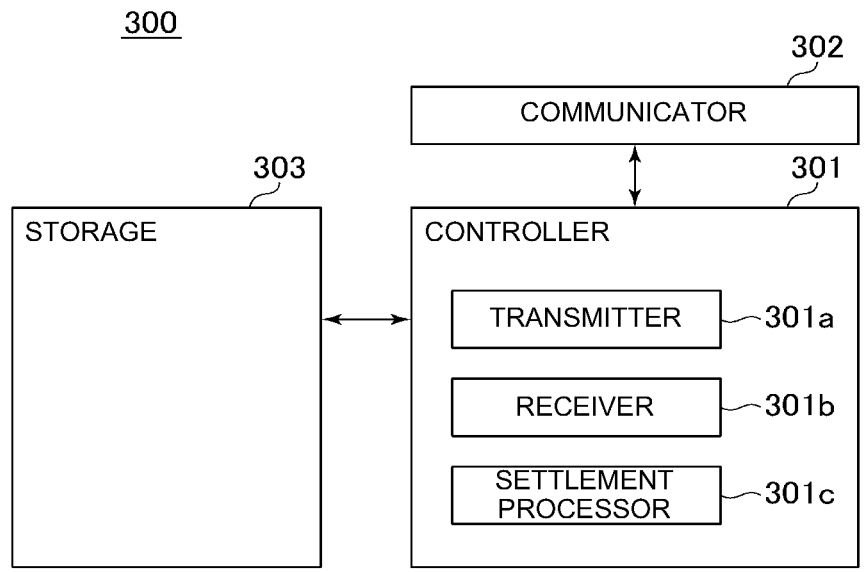
FIG. 11 is a configuration diagram of a second server apparatus.

FIG. 11 shows the configuration of the second server apparatus, and description is made.

As shown in this diagram, the second server apparatus 300 includes a controller 301, a communicator 302, and a storage 303. The controller 301, the communicator 302, and the storage 203 are communicably connected to each other via a bus. Besides these components, an input section that includes a keyboard and a mouse, and a display section, such as a liquid crystal display, for displaying various types of indications may be provided.

The communicator 302 is a communication interface that is achieved by, for example, an NIC or the like, is connected wiredly or wirelessly to a communication network 900, such as the Internet, and communicates with the terminal apparatus 600 and the like. The storage 303 is achieved by, for example, a semiconductor memory element, such as a RAM or a flash memory, an HDD, an optical disk device or the like, and preliminarily stores a program to be executed by the controller 301. The storage 303 further stores settlement information. The controller 301 is achieved by a CPU, an MPU or the like, and executes the program stored in the storage 303, thus functioning as a transmitter 301a, a receiver 301b, and a settlement processor 301c. The controller 301 may include an integrated circuit, such as an ASIC or an FPGA.

The transmitter 301a transmits, for example, a settlement token to the first server apparatus 200 via the communicator 302. The receiver 301b receives, via the communicator 302, a settlement request transmitted by the terminal apparatus 600 of the user. The settlement processor 301c performs a settlement process on the basis of the settlement request. A result of the settlement process is stored as settlement information in the storage 303.

Figure 12:
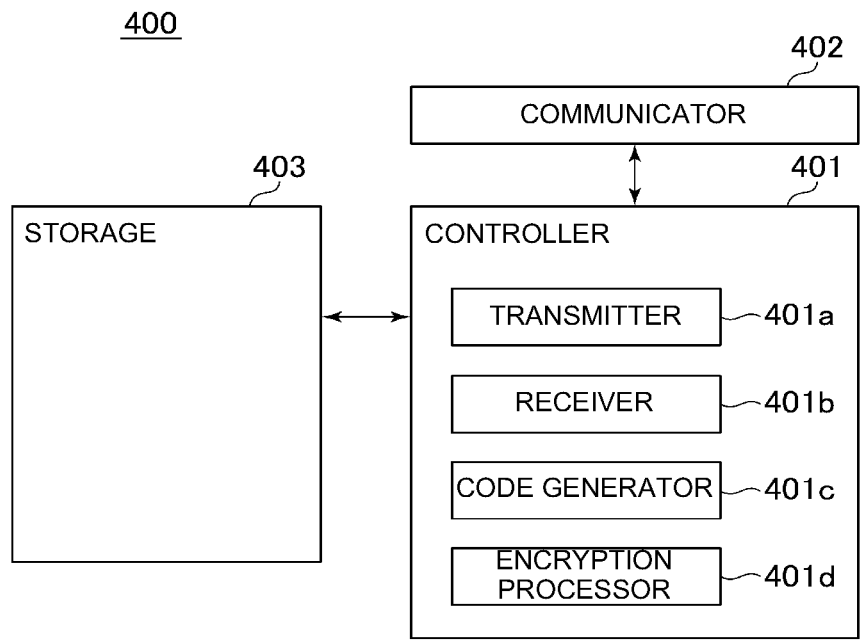
FIG. 12 is a configuration diagram of a third server apparatus.

FIG. 12 shows the configuration of the third server apparatus, and description is made.

As shown in this diagram, the third server apparatus 400 includes a controller 401, a communicator 402, and a storage 403. The controller 401, the communicator 402, and the storage 403 are communicably connected to each other via a bus. Besides these components, an input section that includes a keyboard and a mouse, and a display section, such as a liquid crystal display, for displaying various types of indications may be provided.

The communicator 402 is a communication interface that is achieved by, for example, an NIC or the like, is connected wiredly or wirelessly to a communication network 900, and communicates with the terminal apparatus 600 and the like. The storage 403 is achieved by, for example, a semiconductor memory element, such as a RAM or a flash memory, an HDD, an optical disk device or the like, and preliminarily stores a program to be executed by the controller 401. The controller 401 is achieved by a CPU, an MPU or the like, and executes the program stored in the storage 403, thus functioning as a transmitter 401a, a receiver 401b, a code generator 401c, and an encryption processor 401d. The controller 401 may include an integrated circuit, such as an ASIC or an FPGA.

The transmitter 401a transmits, for example, encrypted data generated by the encryption processor 401d, to the terminal apparatus 600 of the user via the communicator 402. The receiver 401b receives, via the communicator 402, a public key sent from the virtual server apparatus group 700. The code generator 401c generates an unlocking code. The encryption processor 401d then encrypts the unlocking code with the public key, and generates encrypted data.

Figure 13:
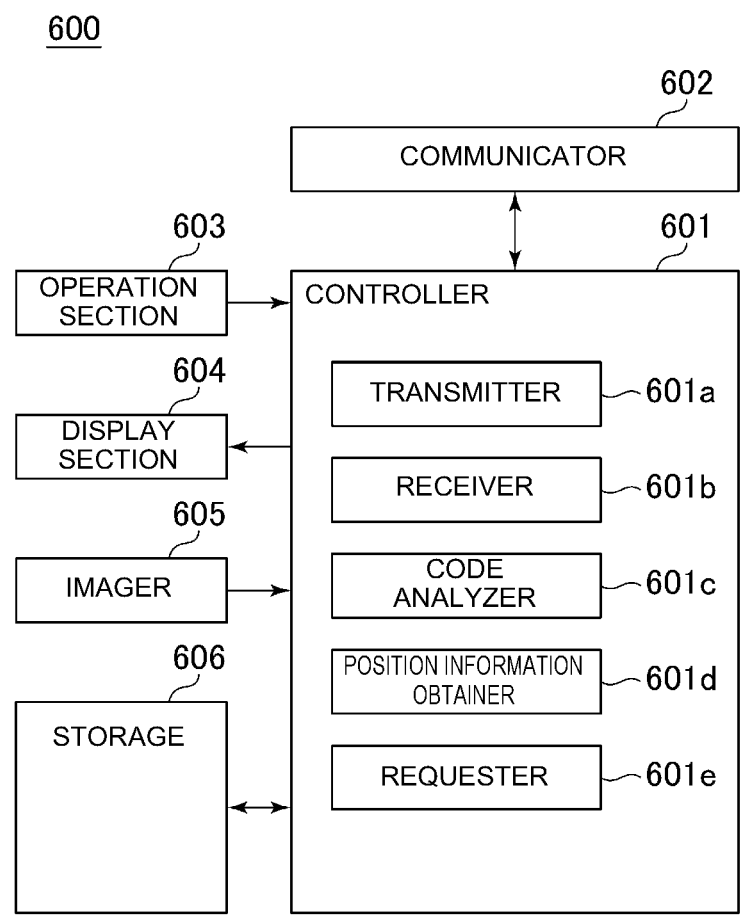
FIG. 13 is a configuration diagram of a terminal apparatus.

FIG. 13 shows the configuration of the terminal apparatus, and description is made.

As shown in this diagram, the terminal apparatus 600 includes a controller 601, a communicator 602, an operation section 603, a display section 604, an imager 605, and a storage 606. These elements 601 to 606 are communicably connected to each other via a control bus. The communicator 602 is a communication interface that is achieved by, for example, an NIC or the like, is connected wiredly or wirelessly to a communication network 4, such as the Internet, and communicates with the first server apparatus 200 and the like.

The operation section 603 is achieved by a mouse, a keyboard and the like, and accepts various types of operation inputs by a user. The display section 604 is achieved by a liquid crystal display or the like, and displays various types of indications. Note that the operation section 603 and the display section 604 may be integrally configured as a touch panel. The imager 605 images a two-dimensional code or the like assigned to a vending machine 800. The storage 606 is achieved by, for example, a semiconductor memory element, such as a RAM or a flash memory, an HDD, an optical disk device or the like, and stores a program to be executed by the controller 601.

The controller 601 is achieved by a CPU, an MPU or the like, and executes the program stored in the storage 606, thus functioning as a transmitter 601a, a receiver 601b, a code analyzer 601c, a position information obtainer 601d, and a requester 601e. Note that the controller 11 may include an integrated circuit, such as an ASIC or an FPGA.

In more detail, the transmitter 601a transmits the vending machine ID obtained by imaging the two-dimensional code assigned to the vending machine 800 through the imager 605, and further by analysis through the code analyzer 601c, and the position information obtained by the position information obtainer 601d, to the first server apparatus 200 via the communicator 602. The receiver 601b receives, via the communicator 602, the encrypted data or the like sent from the third server apparatus 400. The code analyzer 601c analyzes the two-dimensional code imaged by the imager 605, and obtains the vending machine ID. The position information obtainer 601d obtains position information on the terminal apparatus 600 (or the vending machine 800) at the time of imaging, through means, such as the GPS (Global Positioning System) or BLE (Bluetooth (registered trademark) Low Energy). The requester 601e issues a request or the like pertaining to unlocking, to the sensor unit 500, on the basis of an operation on the operation section 603.

Figure 14:
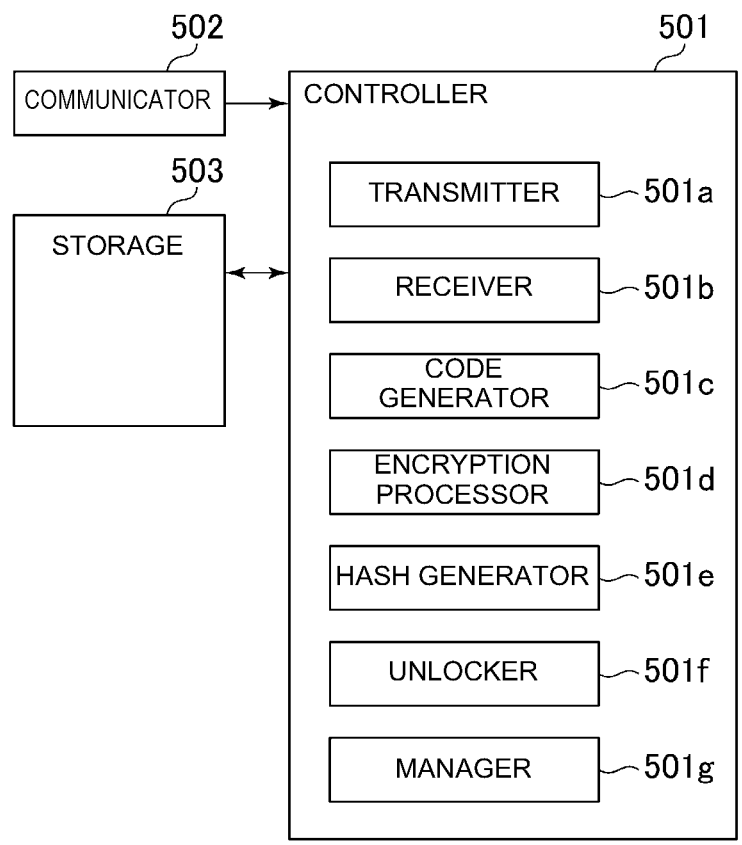
FIG. 14 is a configuration diagram of a sensor unit.

FIG. 14 shows the configuration of the sensor unit, and description is made. The sensor unit is a module installed in the automatic vending machine 800.

As shown in this diagram, the sensor unit 500 installed in the automatic vending machine 800 includes a controller 501 that achieves the entire control, a communicator 502, and a storage 503. The communicator 502 is, for example, a communication interface that is connected wiredly or wirelessly to the communication network 4, such as the Internet, and communicates with the terminal apparatus 600 of the user, the first server apparatus 200 and the like, through near field communication, such as Bluetooth (registered trademark). The storage 503 is achieved by, for example, a semiconductor memory element, such as a RAM or a flash memory, and stores a program to be executed by the controller 501. Furthermore, the storage 503 stores the generated code, the encrypted data having been encrypted, the generated hash and the like.

The controller 501 is achieved by a CPU or the like, and executes the program stored in the storage 503, thus functioning as a transmitter 501a, a receiver 501b, a code generator 501c, an encryption processor 501d, a hash generator 501e, an unlocker 501f, a manager 501g and the like.

The transmitter 501a transmits the generated public key, via the communicator 502, to the virtual server apparatus group 700 that achieves the hash pool. The receiver 501b receives, via the communicator 502, the encrypted data transmitted from the terminal apparatus 600 of the user. The code generator 501c generates a variation number unlocking code. Here, the variation number means that a code generated by a predetermined algorithm is changed every time.

The encryption processor 501d generates a public key and a private key on the basis of, for example, public-key cryptography, and associates a hash value described later with the public key, as required. Furthermore, as required, the variation number unlocking code is encrypted with the public key. Here, typically, according to the public-key cryptography, the public key is open to the public, and a receiving party holds the private key that forms a pair with the public key, and decrypts the received content with the private key as required. However, according to this embodiment, the sensor unit 500 may be both a transmission party and a receiving party. Note that the public-key cryptography includes three algorithms that are a key generation algorithm, an encryption algorithm, and a decryption algorithm. Based on these algorithms, key generation, encryption, and decryption are performed.

In more detail, the key generation algorithm generates and outputs a pair of a public key and a private key. The encryption algorithm receives input of the public key and a bit string called a plain text (a variation number unlocking code in this example), generates an encrypted text (encrypted data), and outputs the text. The decryption algorithm receives input of the private key and the encrypted text (encrypted data), generates the plain text (the variation number unlocking code in this example), and outputs the text.

The hash generator 501e hashes, through a hash function, sensor information (a sensor ID, position information, etc.), and outputs a hash value. The unlocker 501g determines success or failure of the encrypted data sent from the terminal apparatus 600 of the user. When the encrypted data matches with the held encrypted data (or the variation number unlocking code), this unlocker performs unlocking.

Here, in a case where the automatic vending machine is gacha, for example, the unlocking means unlocking of a drive system pertaining to item discharge, and discharging an item. The manager 501h stores, in the storage 503, the public key generated by the encryption processor 501d, and the hash value generated by the hash generator 501e, in association with each other, and manages the public key and the hash value.

Figure 15:
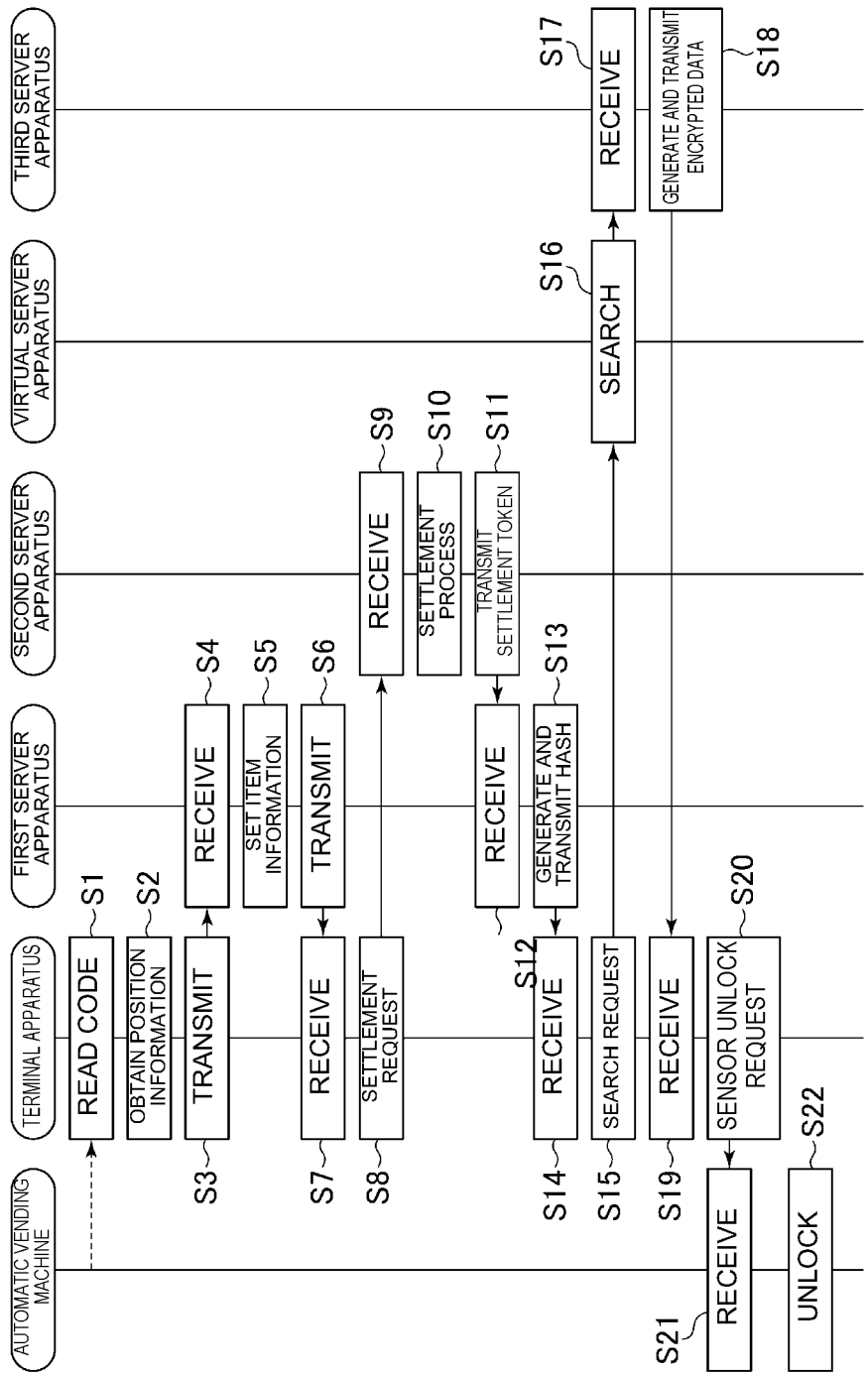
FIG. 15 is a flowchart showing processing procedures by this system.

Hereinafter, referring to the flowchart of FIG. 15, processing procedures of the wireless communication system are described in detail. This also corresponds to a communication method according to this embodiment.

In the terminal apparatus 600 of the user, the imager 605 images the two-dimensional code assigned to the automatic vending machine 800, and the code analyzer 601c analyzes the image to thus obtain the vending machine ID of the automatic vending machine (S1), the position information obtainer 601d obtains position information during imaging through means, such as GPS or GLE (S2), and the transmitter 601a transmits the vending machine ID, and position information to the first server apparatus via the communicator 602 to thus request for obtaining the encrypted data pertaining to the unlocking of the automatic vending machine 800 (S3).

In the first server apparatus 200, the receiver 201b receives the vending machine ID and the position information via the communicator 202 (S4), the item information identifier 201c determines whether the obtained vending machine ID and position information match with the information stored in the vending machine information storage 204, and reads the item information about the item to be vended by the automatic vending machine from the item information storage 205 in the case of matching (S5), and the transmitter 201a transmits the item information in an HTML form or the like to the terminal apparatus 600 of the user via the communicator 202 (S6).

In the terminal apparatus 600 of the user, the receiver 601b receives the item information via the communicator 602 (S7), the item information is displayed with the settlement means on the display section 604 in a selectable manner, and when a desired item is identified by an operation on the operation section 603, the requester 601e issues a settlement request to the second server apparatus 300 via the communicator 602 (S8).

In the second server apparatus 300, the receiver 301b receives the settlement request via the communicator 302 (S9), and the settlement processor 301c performs the settlement process pertaining to an electronic settlement (S10), and the transmitter 301a transmits a settlement token that certifies completion of the electronic settlement to the first server apparatus 200 via the communicator 302 (S11).

In the first server apparatus 200, the receiver 201b receives the settlement token via the communicator 202 (S12), and then the hash generator 201d generates a hash value obtained by hashing, through the hash function, sensor information (the sensor ID, the sensor location, etc.) stored in the sensor information storage 206, and the transmitter 201a transmits the value to the terminal apparatus 600 of the user via the communicator 202 (S13). Note that the hash function that the hash generator 201d uses for hashing is the same as the hash function used in the hash generator 501e of the sensor unit 501, and the sensor information to be hashed is also the same. Accordingly, the same hash value as that on the sensor unit 501 side can be generated.

In the terminal apparatus 600 of the user, the receiver 601b receives the hash value via the communicator 602 (S14), and then the requester 601e issues a search request based on the received hash value to the virtual server apparatus group 700 that achieves the hash pool via the communicator 602 (S15). Upon receipt of the search request, the virtual server apparatus group 700 identifies presence of the hash value, and transmits a public key to the third server apparatus 400 in a case of the presence (S16).

In the third server apparatus 400, the receiver 401b receives the public key via the communicator 402 (S17), the code generator 401c generates the variation number unlocking code, the encryption processor 401d encrypts the unlocking code with the public key on the basis of the encryption logic, and the transmitter 401a transmits the encrypted data to the terminal apparatus 600 via the communicator 402 (S18). Note that the encryption logic used for the encryption process in the third server apparatus 400 is the same as the encryption logic used in the sensor unit 500. The code generation logic used in the code generator 401c is also the same as that used in the sensor unit 500.

In the terminal apparatus 600 of the user, the receiver 601b receives the encrypted data via the communicator 602 (S19), and the requester 601e transmits the encrypted data to the sensor unit 500 installed in the automatic vending machine 800 via the communicator 602 through near field communication, such as Bluetooth (registered trademark), to thus issue a sensor unlock request (S20).

In the automatic vending machine 800, the transmitter 501a of the sensor unit 500 receives the encrypted data via the communicator 502 (S21), the unlocker 501f determines success or failure of the encrypted data, and when it is determined that the encrypted data is correct, this unlocker unlocks the automatic vending machine 800 (S22). The user thus obtains an item through the automatic vending machine 800.

Note that in the sensor unit 500, the code generator 501c may generate the variation number unlocking code, and the success or failure of the encrypted data may be determined by comparing the encrypted data encrypted by the encryption processor 501d according to the encryption logic with the received encrypted data. Alternatively, the determination may be made by decrypting the received encrypted data according to the decryption logic of the encryption processor 501d to obtain the variation number unlocking code, and comparing this code with the variation number unlocking code generated by the code generator 501c.

As described above, according to the second embodiment, the terminal apparatus of the user is only provided with the hash value generated based on the sensor information and the encrypted data. Accordingly, the variation number unlocking code can be prevented from leaking on the web, and more secure transactions can be achieved.

The first server apparatus that may be a database server or the like, and the third server apparatus that generates the encrypted data, use the same logic as the sensor unit for generating hash and for generating the encrypted data. Accordingly, the variation number unlocking code and the hash are not required to be transmitted or received. Also in this point, more secure transactions can be achieved.

The encryption data is generated by encrypting the variation number unlocking code with the public key by the third server apparatus having received the public key from the hash pool. Accordingly, the encrypted data can be prevented from leaking. That is, superiority for preventing encrypted data leaking accidents can be secured.

Furthermore, the hash value is generated by the first server apparatus, and transmitted to the terminal apparatus of the user. The encrypted data is generated by the third server apparatus and transmitted to the terminal apparatus of the user. Thus, targets of attacks are widened by the information decentralization, which eventually prevents attacks.

The public key is managed by the hash pool. Accordingly, in case of an attack, the area can be immediately moved and the pool can be rebuilt. Thus, the public key can be more safely managed.

Furthermore, the encrypted data generated by the third server apparatus is updated in a short time period. Accordingly, even in case of an attack, the possibility of decryption is probabilistically equivalent to zero.

The hash management is adopted as the basis. Accordingly, in view of probability, the more the system increases, the more the safety is secured.

Even in case the sensor unit installed in the automatic vending machine is physically attacked, the damage is only to the automatic vending machine and does not affect the other components. Accordingly, measures can be immediately taken.

The second embodiment of the present disclosure has thus been described above. The present disclosure is not limited thereto, and various modifications and changes can be made. For example, it is a matter of course that the sensor units installed in the respective automatic vending machines form a sensor network in predetermined units, and uploading of the public key to the hash pool and the like may be integrally performed by a sensor unit having a sufficient amount in the power source, thus achieving power saving.

The invention claimed is:

1. A communication method, comprising:
   a first step of causing a terminal apparatus to image a two-dimensional code assigned to an automatic vending machine and obtain a vending machine ID, obtain position information, and transmit the vending machine ID and the position information to a first server apparatus, to thus request obtainment of encrypted data pertaining to unlocking of the automatic vending machine;
   a second step of causing the first server apparatus to determine whether the vending machine ID and the position information match with stored information, and transmit item information to the terminal apparatus when the information matches;
   a third step of causing a second server apparatus to receive a settlement request issued by the terminal apparatus, execute a settlement process, and transmit a settlement token to the first server apparatus;
   a fourth step of causing the first server apparatus to receive the settlement token, generate a hash value obtained by hashing sensor information through a hash function, and transmit the hash value to the terminal apparatus;
   a fifth step of causing the terminal apparatus to issue a search request to a virtual server apparatus group that achieves a hash pool by the hash value;
   a sixth step of causing the virtual server apparatus group to receive the search request, identify presence of the hash value, and transmit a public key to a third server apparatus in a case of the presence;
   a seventh step of causing the third server apparatus to generate an unlocking code, encrypt the unlocking code with the public key, and transmit encrypted data to the terminal apparatus;
   an eighth step of causing the terminal apparatus to transmit the encrypted data to a sensor unit of the automatic vending machine to thus request unlocking of the automatic vending machine; and
   a ninth step of causing the sensor unit to determine success or failure of the encrypted data, and unlock the automatic vending machine in a case of the success.

2. The communication method according to claim 1, wherein in the ninth step, the sensor unit generates the unlocking code, encrypts the unlocking code, and compares encrypted data with the encrypted data transmitted from the terminal apparatus to thus determine success or failure of the encrypted data.

3. The communication method according to claim 1, wherein the unlocking code is a variation number unlocking code.

4. A communication system, comprising:
   a terminal apparatus that images a two-dimensional code assigned to an automatic vending machine and obtains a vending machine ID, obtains position information during imaging, transmits the vending machine ID and the position information to a first server apparatus, and issues a search request to a virtual server apparatus group that achieves a hash pool by a hash value transmitted from the first server apparatus, and then transmits encrypted data transmitted from a third server apparatus, to a sensor unit of the automatic vending machine, to thus request unlocking of the automatic vending machine;
   the first server apparatus determines whether the vending machine ID and the position information match with stored information, transmits item information to the terminal apparatus when the information matches, and upon receipt of a settlement token, generates the hash value obtained by hashing stored sensor information through a hash function, and transmits the hash value to the terminal apparatus;
   a virtual server apparatus group that, when receiving a search request by the hash value from the terminal apparatus, identifies presence of the hash value, and transmits a public key to the third server apparatus in a case of the presence;
   the third server apparatus that generates an unlocking code, encrypts the unlocking code with the public key, and transmits the encrypted data to the terminal apparatus; and
   a sensor unit that generates the public key and transmits the public key to the virtual server apparatus group, and receives the encrypted data from the terminal apparatus, and determines success or failure of the encrypted data, and unlocks the automatic vending machine in a case of determination of the success.

5. The communication system according to claim 4, wherein the sensor unit generates the unlocking code, encrypts the unlocking code, and compares encrypted data with the encrypted data transmitted from the terminal apparatus to thus determine success or failure of the encrypted data.

6. The communication system according to claim 4, wherein the unlocking code is a variation number unlocking code.

7. A sensor unit that is installed in an automatic vending machine, and unlocks the automatic vending machine, based on encrypted data transmitted from a terminal apparatus, the sensor unit comprising:
   an encryption processor that generates a public key and a private key, and encrypts an unlocking code with the public key;

a hash generator that hashes, through a hash function, sensor information including at least a sensor ID and position information on a sensor, and outputs a hash value;

a manager that stores, in a storage, at least the public key generated by the encryption processor, and the hash value generated by the hash generator, in association with each other, and manages the public key and the hash value; and an unlocker that determines success or failure of encrypted data transmitted from the terminal apparatus, and unlocks the automatic vending machine when the encrypted data matches with encrypted data generated by the encryption processor.

8. The communication method according to claim 2, wherein the unlocking code is a variation number unlocking code.

9. The communication system according to claim 5, wherein the unlocking code is a variation number unlocking code.

* * * * *